United States Patent [19]

Arzoian et al.

[11] Patent Number: 4,955,851
[45] Date of Patent: Sep. 11, 1990

[54] TRANSMISSION AND METHOD OF OPERATION

[75] Inventors: John Arzoian, Dearborn; Shan Shih, Troy; Edward G. Trachman, Birmingham, all of Mich.

[73] Assignee: Rockwell International Corporation, Pittsburgh, Pa.

[21] Appl. No.: 235,140

[22] Filed: Aug. 23, 1988

[51] Int. Cl.⁵ .............................................. F16H 47/08
[52] U.S. Cl. ....................................... 475/59; 475/280
[58] Field of Search ................. 74/760, 761, 764, 765, 74/688, 730, 731, 732, 730.1, 731.1, 732.1; 475/47, 59, 280, 282, 284, 286

[56] References Cited

U.S. PATENT DOCUMENTS

| | | | |
|---|---|---|---|
| 2,803,974 | 8/1957 | Kelley | 74/677 |
| 2,981,125 | 4/1961 | Dodge | 74/688 |
| 3,063,308 | 11/1962 | Wayman | 74/730 X |
| 3,120,763 | 2/1964 | Shuster | 74/472 |
| 3,296,891 | 1/1967 | Tuck | 74/688 X |
| 3,313,179 | 4/1967 | Flinn | 74/765 X |
| 3,319,490 | 5/1967 | Waclawek | 74/677 |
| 3,333,486 | 8/1967 | Stockton | 74/677 |
| 3,396,606 | 8/1968 | Tuck | 74/677 |
| 3,863,524 | 2/1975 | Mori et al. | 74/765 |
| 3,986,413 | 10/1976 | Stockton | 74/688 |
| 4,056,019 | 11/1977 | Ahlen | 74/677 |
| 4,483,215 | 11/1984 | Ishimaru et al. | 74/765 X |
| 4,617,835 | 10/1986 | Baker | 74/677 |

FOREIGN PATENT DOCUMENTS

| | | |
|---|---|---|
| 208015 | 1/1987 | European Pat. Off. . |
| 208063 | 1/1987 | European Pat. Off. . |
| 208840 | 1/1987 | European Pat. Off. . |

Primary Examiner—Dwight Diehl

[57] ABSTRACT

A transmission has torque converter with an impeller, primary and secondary turbines and a stator. In a first planetary gear set the carrier is connected to the primary turbine, the sun gear is connected to the secondary turbine and the ring gear is connected to a friction clutch. This friction clutch is used in the first and last forward driving phases and in reverse. A second planetary gear set has a second carrier connected to the output shaft and a second ring gear connected to the first carrier. A brake is connected to the friction clutch and to the second sun gear for low forward speed range. A second friction clutch locks up the second planetary gear in high speed. A one-way clutch connected to the stator provides phase differentiation in all forward speed ranges. A third friction clutch between the impeller and second turbine is required in conjunction with the first and second clutches to provide the final driving phase. Another brake brakes the primary turbine, the first carrier, and the second ring gear in reverse operation, causing the secondary turbine to drive the first sun gear and the first ring gear to drive the second sun gear through the first clutch to turn the output shaft slowly in reverse.

16 Claims, 4 Drawing Sheets

TRANSMISSION AND METHOD OF OPERATION

The transmission and method of operation of the present invention are related to the transmission disclosed in copending applications Ser. Nos. 751,401 and 751,402, both filed on July 3, 1985.

BACKGROUND OF THE INVENTION (1) Field of the Invention

This invention relates to transmissions which combine a torque converter with planetary gearing, particularly those in which plural power paths are provided between the torque converter and planetary gearing.

(2) Description of the Related Art

In transmissions of the type provided by the present invention, and all transmissions, it is highly desirable to decrease the weight and to increase the strength and reliability while improving the efficiency of the transmission. While the achievement of any one of these goals may be more or less difficult, the achievement of all of these goals in the same transmission presents a complex problem, or more appropriately, many complex interrelated problems.

Combining high torque at stall speed with high operation efficiency at high speed creates a special problem or group of problems.

The present invention seeks to solve these problems by providing an improved transmission apparatus and method of operation which uniquely accomplishes these stated goals, while using fewer parts. The use of fewer parts in the transmission of the present invention inherently reduces the weight of the transmission, thereby increasing its operating efficiency while maintaining strength an reliability.

It is therefore an object of the present invention to provide an improved transmission having a reduced number of parts, and to provide a unique interrelationship between the parts to produce a high torque output at stall speeds and increased efficiency at higher speeds.

SUMMARY OF THE INVENTION

The improved transmission of the present invention includes a four element torque converter with an impeller, primary and secondary turbines a stator, and two planetary gearing systems.

In a first planetary gear set of the two planetary gearing systems a first carrier is connected to the primary turbine, a first sun gear is connected to the secondary turbine and a first ring gear is connected to a first friction clutch.

In a second planetary gear set of the two planetary gearing systems a second carrier is connected to the transmission output shaft, a second ring gear is connected to the first carrier and a second sun gear is connected to a second brake.

The improved transmission of the present invention produces four forward speed ranges and two reverse speed ranges. The four forward speed ranges, are comprised of a first forward and second forward low speed range, and a first forward and second forward drive speed range with a different phase of operation occurring in one of the low forward speed ranges and one of the drive forward speed ranges. The two reverse ranges include a low speed and high speed reverse range.

The second brake is connected to the first friction clutch and to the second sun gear and is engaged in the first and second forward low speed ranges. The first friction clutch is engaged in the first forward low speed range, in the second forward drive speed range, and in reverse. The first clutch is released during other transmission range operations. A second friction clutch locks up the second planetary gear set in the first and second forward drive speed ranges. A third friction clutch is positioned between the impeller and the secondary turbine and is engaged in the second forward drive range. An additional brake brakes the primary turbine, the first carrier, and the second ring gear in reverse range operations.

A one-way clutch connected between the transmission housing and the stator produces the two different phases of operation in the two forward speed ranges, one phase when the one-way clutch secures the stator against rotation and the other phase when the clutch and stator overrun.

The primary turbine of the torque converter drives the first carrier of the first planetary system and the secondary turbine of the torque converter drives the first sun gear of the first planetary system. The first carrier is connected to the second ring gear of the second planetary system, and the transmission output shaft is connected to the second carrier.

In the first forward low speed range the first ring gear is braked and input torque is transmitted by the primary and secondary turbines to the first carrier and the first sun gear of the first planetary system respectively. The torque transmitted by the primary and secondary turbines is added in the first planetary system.

In the second forward low speed range the first ring gear is released, resulting in the input torque being transmitted by the primary turbine to the first carrier and the free wheeling of the secondary turbine and the first ring gear.

In the first forward drive speed range the second ring gear and second sun gear are clutched together and the second planetary gearing system rotates as a unit.

The second forward drive speed range is produced by clutching the torque converter impeller to the secondary turbine and clutching the first ring gear to the second sun gear of the previously locked up second planetary gearing system. This locks up the first planetary gearing system and provides a direct drive through the transmission.

The automatic release and overrunning of the one-way clutch connected to the stator provides additional phases of operation in the second forward low speed range and the first forward drive speed range.

The improved transmission produces a reverse low speed range by braking the primary turbine, the first carrier and the second ring gear. The secondary turbine drives the first sun gear and the first sun gear drives the pinions of the braked first carrier which drives the first ring gear. The first ring gear in turn, through the engagement of the first friction clutch, drives the second sun gear and output is taken from the second carrier.

The reverse high speed range is produced by clutching the input shaft and torque converter impeller to the secondary turbine, while the primary turbine, the first carrier and the second ring gear remain braked. This provides a direct mechanical coupling between the input shaft and the secondary turbine instead of the fluid coupling between the input shaft and the secondary turbine provided in the low speed reverse range.

In the preferred embodiment an engine speed control device is provided in the control system for the improved transmission to limit the engine speed in the reverse high speed range to two-thirds the engine speed permitted in the forward ranges for optimum performance in the reverse ranges.

BRIEF DESCRIPTION OF THE DRAWINGS

Further objects and features of the present invention are revealed in the following description of the preferred embodiments and the drawings wherein.

DESCRIPTION OF THE PREFERRED EMBODIMENT

Figure 1:
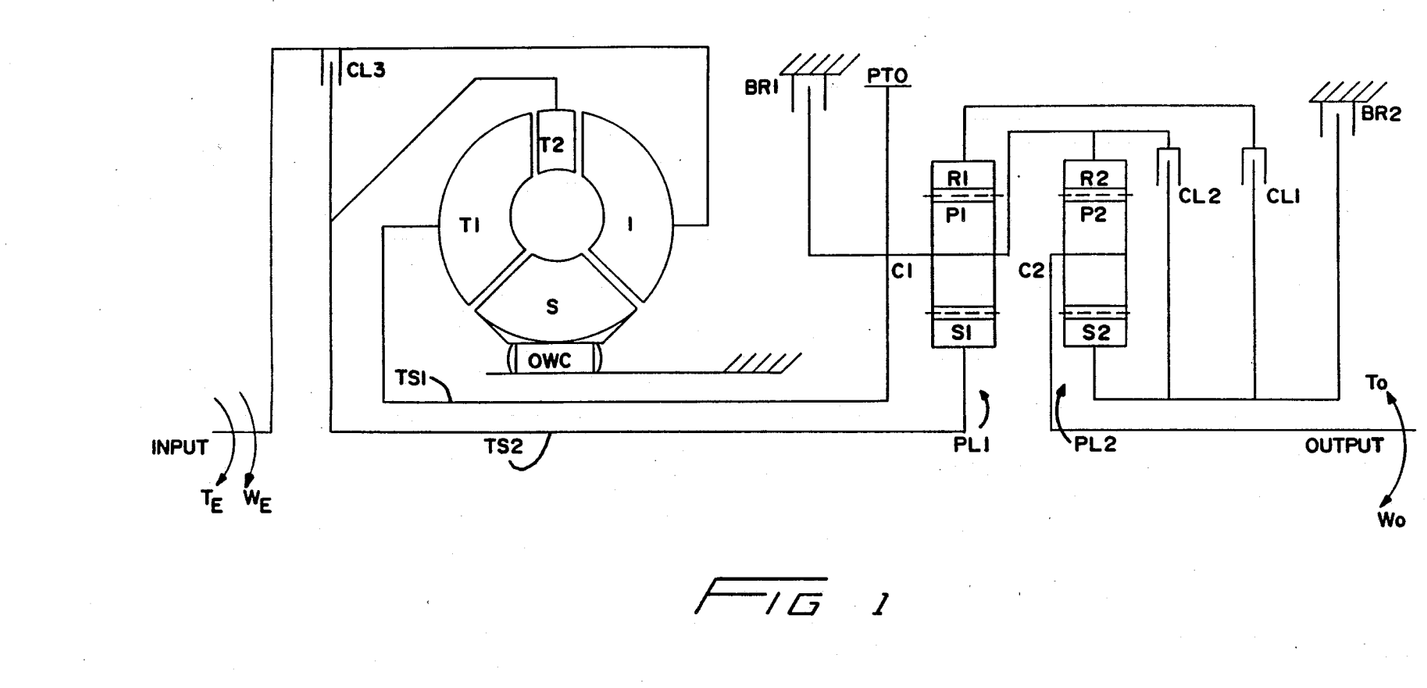
FIG. 1 shows a schematic drawing of the transmission of the present invention.

The present invention as show in FIG. 1 provides an improve automatic transmission apparatus comprising an input shaft (INPUT), an output shaft (OUTPUT), a four element torque converter having an impeller I, connected to the input shaft, a primary turbine T1 in fluid communication with the impeller, a secondary turbine T2 in fluid communication with the impeller I and a stator S in fluid communication with the impeller and the turbines. The impeller I, turbines T1, T2 and the stator S are arranged in a fluid flow sequence in which the impeller I delivers fluid to the secondary turbine T2 and then to the primary turbine T1, and in which the fluid returns from the primary turbine T1 via the stator S to the impeller I. The input shaft (INPUT) is driven by an engine (not shown) and rotates in the direction indicated by the arrows TE for engine torque and $W_e$ for engine speed. The input shaft drives the impeller I, and the impeller produces fluid flow in the torque converter to drive the primary turbine T1 and the secondary turbine T2. The fluid then returns to the impeller via the stator. A one-way clutch (OWC) is connected between the stator S and the transmission housing. The one-way clutch is active until the relative speed of the primary turbine and impeller reaches a predetermined value. The one-way clutch becomes active when relative speed of the primary turbine and impeller is below this predetermined value.

First PL1 and second PL2 planet gear sets are connected to the turbines. The first planetary gear set PL1 comprises a first sun gear S1, first planet gears P1, a first planet gear carrier C1, and a first ring gear R1. The second planetary gear set PL2 comprises a second sun gear S2, second planet gears P2, a second planet gear carrier C2, and a second ring gear R2.

In the first gear set PL1 the first planet gear carrier C1 is connected to a first brake BR1 and to the primary turbine T1 through a primary turbine shaft TS1 for rotation therewith, and the first sun gear S1 is connected to the secondary turbine T2 through secondary turbine shaft TS2 for rotation therewith. The primary turbine T1 is also connected to a power take-off PTO. A first friction clutch CL1 is connected between the first ring gear R1 and the second sun gear S2 and a second brake BR2.

In the second planetary gear set PL2 the second ring gear R2 is connected to the first planet carrier C1, the second planet carrier C2 is connected to the output shaft (OUTPUT) upon which the output torque $T_o$ and the output speed $W_o$ are produced, and the second sun gear S2 is connected to the second brake BR2 and the first and second friction clutches CL1, CL2. The second friction clutch CL2 connects the second sun gear S2 and the second brake BR2 to the second ring gear R2 and the first carrier C1 and selectively locks up the secondary planetary gear set PL2. The first brake BR1 is connected to the primary turbine T1 and the first carrier C1. The second brake BR2 is connected to the first and second friction clutches CL1, CL2 and to the second sun gear S2. A third friction clutch CL3 connects the input shaft (INPUT) and the impeller I to the secondary turbine T2.

In the preferred method of operating the transmission of the present invention, the first forward low speed range is established between the input shaft (INPUT) and the output shaft (OUTPUT) by the engagement of the second brake BR2 and engaging the first clutch CL1. This brakes the second sun gear S2 and the first friction clutch CL1, thereby braking the first ring gear R1 with the first friction clutch CL1 engaged. A portion of the input torque is transmitted from the primary turbine T1 to the first planet carrier C1, and an additional portion of the input torque is transmitted from the secondary turbine T2 to the first sun gear S1 and is added to the torque transmitted to the first planet carrier C1. The torque output from the first planet carrier C1 is transmitted to the second ring gear R2. With the second brake BR2 engaged, the second sun gear S2 is held stationary. The second ring gear R2 slowly drives the second planet gears P2 around the braked second sun, causing the second carrier C2 and the output shaft to rotate (OWC is active in this range).

The first friction clutch CL1 remains engaged until the ratio NR of the relative speed of rotation between the primary turbine T1 and the impeller I increases to a predetermined ratio. As the ratio NR of the primary turbine T1 speed of rotation to the impeller I speed of rotation (T1/I) approaches the first predetermined value (preferably 0.4), the secondary turbine T2 stops delivering torque and the first clutch CL1 is released establishing the second forward low speed range. The torque transmitted by the primary T1 and the secondary T2 turbines is no longer combined in the first planetary gear set PL1. The torque is transmitted from the primary turbine T1 through the first carrier C1 and the second ring gear R2 to the second carrier C2 and the output shaft (OWC is active at this time).

Initially, during operation in the second forward low speed range the stator keeps OWC in the engaged or "active" direction to hold the stator S fixed to the transmission housing until the relative speeds of rotation of primary turbine T1 and the impeller I reach a second predetermined ratio value. When the rotation speed of the primary turbine T1 reaches the second predetermined speed ratio (preferably 0.9) with the rotation speed of the impeller I, the one-way clutch OWC overruns (becomes "inactive") and the stator S is driven by fluid circulation in the same direction as the primary turbine T1, thereby establishing the second phase of the second forward low speed range.

In the first forward drive speed range of the present invention, when the rotation speed of the primary turbine T1 reaches a third predetermined speed ratio (preferably 0.95) with the rotation speed of the impeller I the second brake BR2 is released and the second friction clutch CL2 is activated locking up the second ring gear R2 to the second sun gear S2 and thus locking up the second planetary gear set PL2. The input torque transmitted from the primary turbine T1 to the first carrier C1 is transmitted from the first carrier C1 directly through the locked up second planetary gear set PL2 to the output shaft.

Initially, in the first forward drive speed range, the ratio NR of the speed of rotation of the primary turbine T1 to the speed of rotation of the impeller I is below the second predetermined ratio (0.9) and the one-way clutch OWC is active connecting the stator to the transmission housing. The one-way clutch OWC remains active until the ratio NR of the relative speed of rotation of the primary turbine T1 to the impeller I reaches the second predetermined ratio value. As the speed ratio of the primary turbine and the impeller (T1/I) increases to and exceeds the second predetermined value (0.9), the one-way clutch OWC becomes disengaged and overruns and the stator is driven by fluid circulation in the same direction of rotation as the primary turbine T1 thereby establishing the second phase of the first forward drive speed range.

In the fourth lock-up range or second forward drive speed range the first clutch CL1 and the third clutch CL3 are engaged along with the previously engaged second clutch CL2. The first clutch and third clutch are engaged, thereby connecting the input shaft and the impeller to the secondary turbine shaft TS2, upon reaching the third predetermined ratio (0.95) between the primary turbine T1 and the impeller I rotation speeds, establishing the direct drive range. In this range of operation the input torque is transmitted directly through the transmission to the output shaft.

It should be noted that although each forward speed range has been particularly named as either a low range or a drive range, different nomenclature may be equally applied to these speed ranges. For purposes of the invention, it is merely important to realize that the first forward low speed range constitutes a first forward speed range; the second forward low speed range constitutes a second forward speed range; the first forward drive speed range constitutes a third forward speed range, and the second forward drive speed range constitutes a fourth forward speed range.

The reverse low speed range is established between the input shaft (INPUT) and the output shaft (OUTPUT of the present transmission by engaging the first brake BR1 and the first clutch CL1, thereby locking the primary turbine T1, the first planet carrier C1 and the second ring gear R2 to the transmission housing. Torque is transmitted from the secondary turbine through the first sun gear S1 and the first planet gears P1 to the first ring gear R1, and from the first ring gear R1 through the engaged, first friction clutch CL1 to drive the second sun gear S2. The second sun gear then drives the second carrier C2 and the output shaft in the reverse direction.

The reverse high speed range is established by engaging the third clutch CL3 when the speed of rotation of the secondary turbine T2 reaches the speed of rotation of the impeller I. Engaging the third clutch CL3 couples the input shaft (INPUT) an the torque converter impeller I to the secondary turbine T2, while the primary turbine T1, the first carrier C1 and the second ring gear R2 remain braked to the transmission housing. Engaging the third clutch CL3 provides a direct mechanical connection between the input shaft (INPUT) and the secondary turbine T2 instead of the fluid coupling between the input shaft and the secondary turbine provided in the reverse low speed range.

The above described operation of the one-way clutch OWC is automatic. The operation of the reverse control or first brake BR1 is controlled by manually positioning a shift lever in the reverse position as is known in the art. The reverse high speed range is established automatically when the secondary turbine speed T2 reaches the input speed $W_e$. Low range may be selected manually, engaging the second brake BR2 and the first clutch CL1, by manually positioning a select lever in the low position. Manually selecting the drive range automatically engages the second brake BR2 and the first clutch CL1 at zero speed, and releases the first clutch CL1 and eventually releases the second brake BR2 and engages the second clutch CL2 when torque and speed are interrelated in a predetermined manner to automatically shift the transmission through the first three forward ranges as is commonly done in automatic transmission control systems. For direct drive, the lock up or third clutch CL3 together with the first clutch CL1 are engaged automatically upon reaching a predetermined ratio of the speed of rotation of the primary turbine T1 and the impeller I (preferably 0.95).

Figure 2:
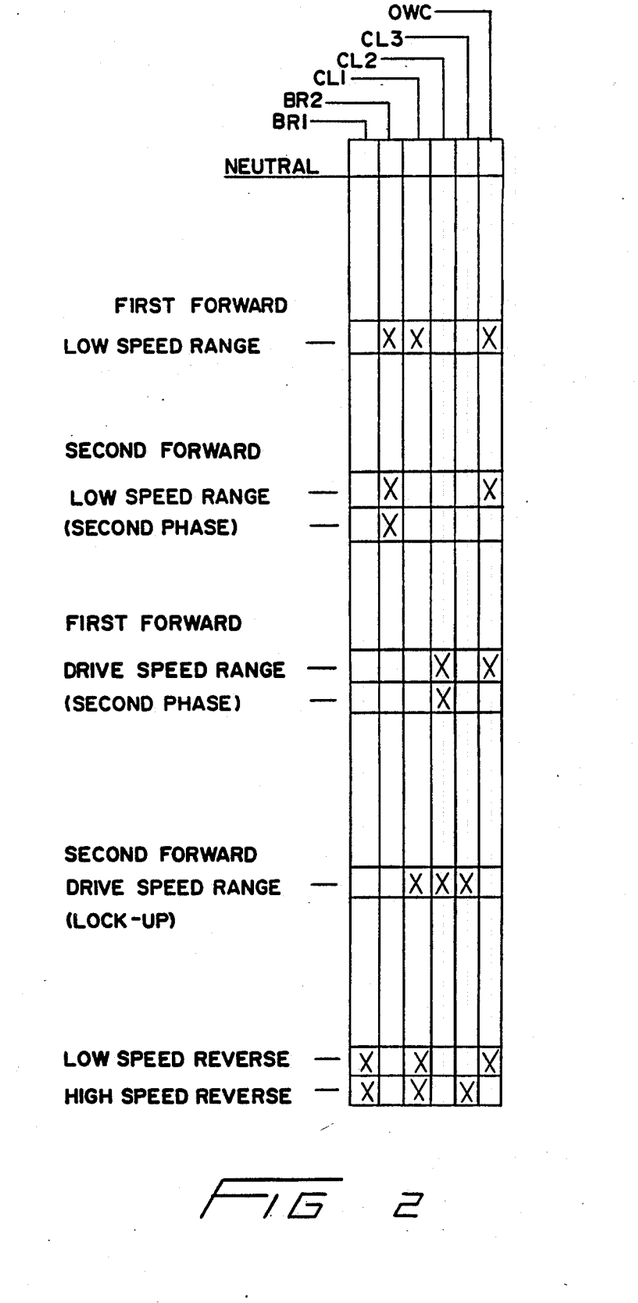
FIG. 2 shows a chart illustrating the brake and clutch engagement control conditions for the neutral range, the first forward low speed range, the second forward low speed range, the second phase of the second forward low speed range, the first forward drive speed range, the second phase of the first forward drive speed range, the second forward drive speed range and the reverse ranges.
Figure 3A:
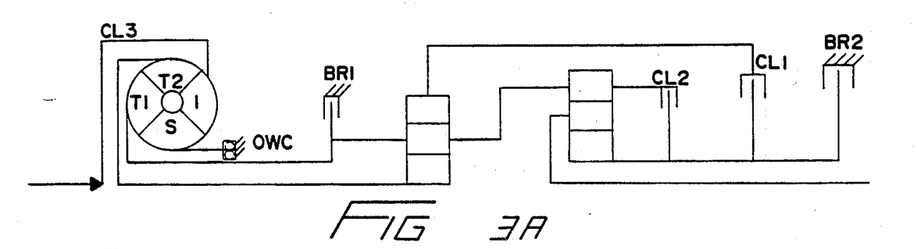
FIGS. 3A-3F show schematic representations of the power flow paths for a transmission operation according to the control conditions as shown in FIG. 2 where: 3A is the neutral range, 3B is the first forward low speed range, 3C is the second forward low speed range, 3D is the first forward drive speed range, 3E is the second forward drive speed range, and 3F is the reverse range.
Figure 3B:
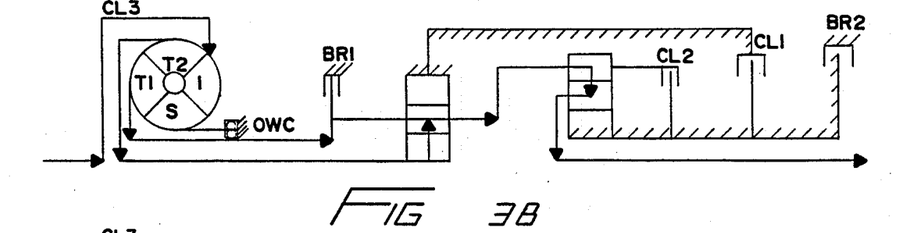
Figure 3C:
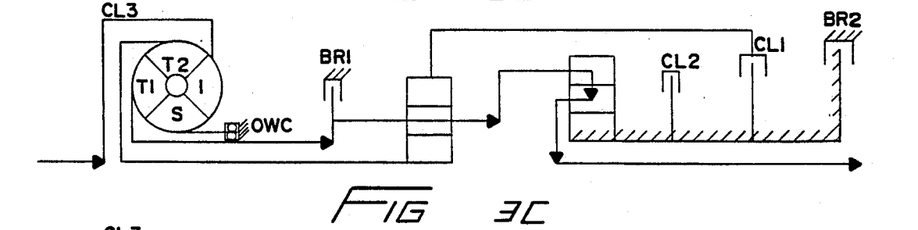
Figure 3D:
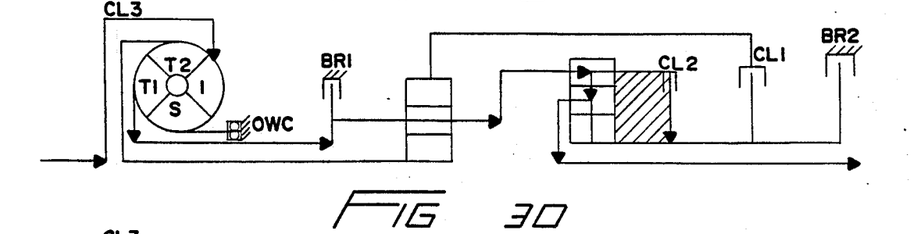
Figure 3E:
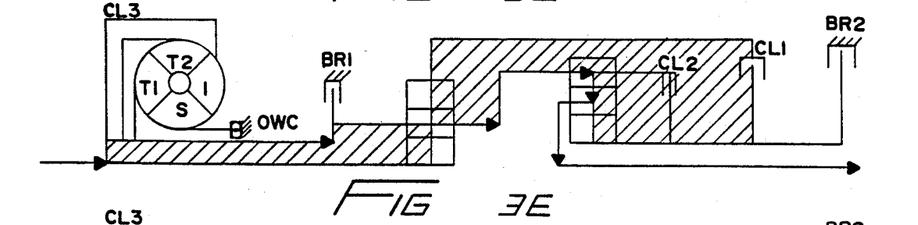
Figure 3F:
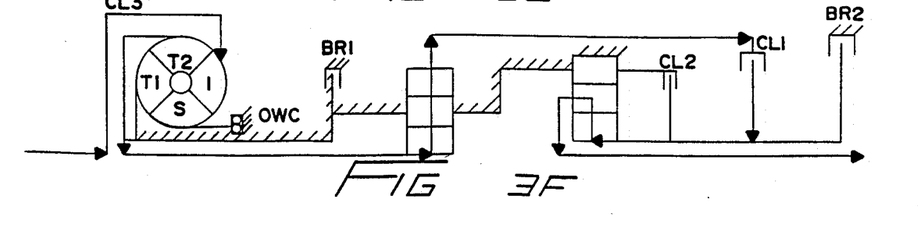

The four forward and two reverse ranges of operation and the corresponding engaged/disengage conditions of the brakes and clutches are shown in the chart of FIG. 2. The X appearing in a column indicates the engaged condition of the brake or clutch. The first column which indicates the engaged/disengaged condition of the first brake BR1 is manually controlled by positioning a shift lever in the reverse position. The second column indicates the engaged/disengaged condition of the second brake BR2 and is either manually controlled by moving the selector lever into the low range position or automatically controlled by moving the selector lever to the drive range. The second, third, and fourth columns are automatically controlled by moving the selector lever into the drive range. The last column is automatically controlled without a change in the selector lever position.

FIG. 3 shows the drive paths through the transmission for different transmission range operations. In FIG. 3A the transmission is in neutral. In FIG. 3B the transmission is in the first forward low speed range and the first clutch CL1 is engaged establishing the first forward speed range. In FIG. 3C the transmission is in the second forward low speed range and the first clutch CL1 is disengaged establishing the second forward speed range. In the first and second speed range the one-way clutch OWC is engaged. In the second phase of the second forward low speed range the one-way clutch is disengaged and overruns. In FIG. 3D the transmission is in the first forward drive speed range with the secondary planetary gear set locked establishing the third forward speed range. The one-way clutch OWC is engaged and disengage respectively in the first forward drive speed range. In FIG. 3E the system is in direct drive with the first clutch CL1, second clutch CL2 and third clutch CL3 engaged, and the torque converter locked establishing the fourth forward speed range. In FIG. 3F the system is in reverse low speed with the first brake BR1, the first clutch CL1 and the one-way clutch OWC engaged. In reverse high speed the third clutch CL3 is also engaged.

Figure 4:
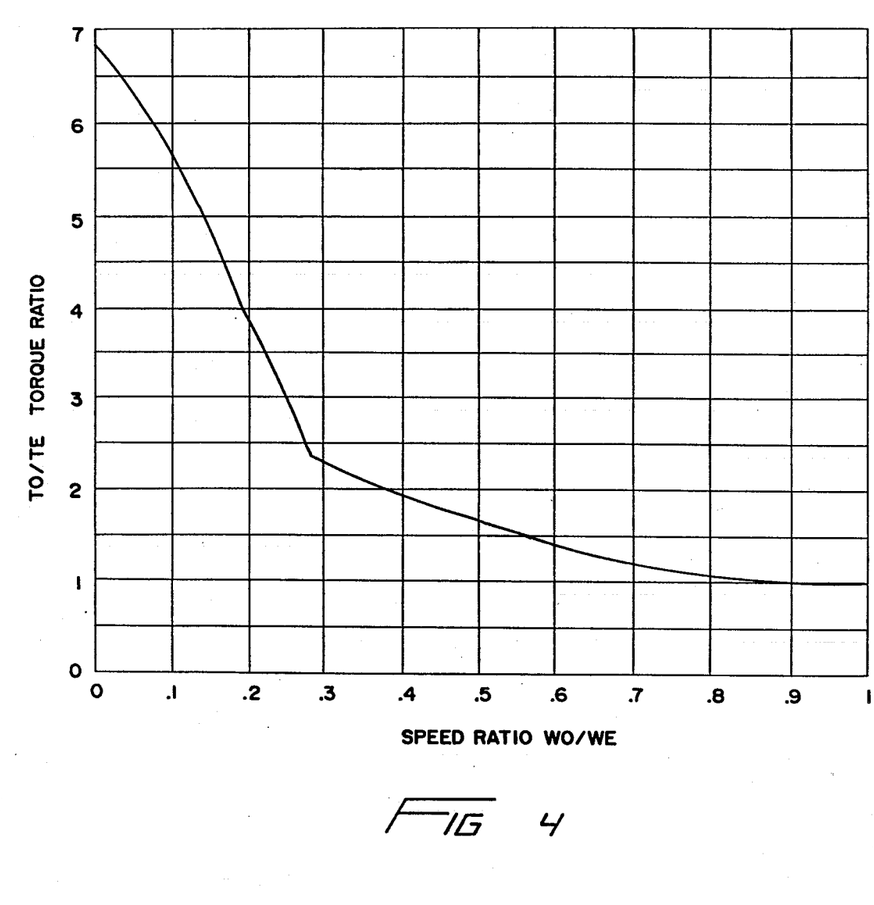
FIG. 4 is a graph showing the relationships between the ratio of the transmission output and input torque and the ratio of the transmission output and input rotation speed.

FIG. 4 shows a graph that represents the relationship between different values of output to input torque ratios and output to input rotation speed ratios. As can be seen in FIG. 4 the present transmission provides high torque at low speeds, with a substantially smooth torque transmission to intermediate speeds.

The transmission of the present invention also provides overrun braking when the vehicle coasts in any of the four forward and two reverse ranges.

In the second forward drive speed range the first clutch CL1, the second clutch CL2, and the third clutch CL3 are engaged locking up the transmission and providing direct overrun braking from the engine (not shown).

In the first forward drive speed range the second clutch CL2 is engaged locking u the second planetary gear set and the output shaft (OUTPUT) directly drives the primary turbine T1 fluidly coupled to the engine (not shown) to provide the overrun braking.

In the second forward low speed range the second brake BR2 is engaged and the output shaft (OUTPUT) drives the second ring gear R2 through the second carrier C2. The second ring gear R2 drives the first carrier C1 and the primary turbine T1 fluidly coupled to the engine (not shown) to provide overrun braking.

In the first forward low speed range the second brake BR2 and first clutch CL1 are both engaged. The output shaft (OUTPUT) drives the secondary turbine T2 at a greater speed than it drives the primary turbine T1 and the fluid coupling of the secondary turbine with the engine (not shown) provides the overrun braking.

In the reverse speed ranges the first brake BR1 and the first clutch CL1 are engaged. The output shaft (OUTPUT) drives the second carrier C2 and, in turn, drives the first ring gear R1 at a speed greater than the output shaft speed through the second sun gear S2 and the engaged first clutch CL1. The first ring gear R1 drives the first sun gear S1 and the secondary turbine T2 through the first planet pinions P1. The fluid coupling of the secondary turbine T2 to the engine (not shown) provides the overrun braking.

In the reverse high speed range the third clutch CL3 is also engaged directly connecting the secondary turbine to the engine to provide the overrun braking.

While the present invention has been described by reference to a specific embodiment, it should be understood that modifications, and variations of the invention may be constructed without departing from the scope of the invention defined in the following claims.

We claim:

1. A planetary transmission apparatus comprising:
a transmission housing;
an input shaft;
an output shaft;
a first planetary gear set in said housing including a first sun gear, a first planet gear carrier, first planet gears mounted for rotation on said first planet gear carrier and in meshing engagement with said first sun gear, and a first ring gear in meshing engagement with said first planet gears, said first planetary gear set being arranged to be driven by said input shaft;
a second planetary gear set in said housing operatively connected with said first planetary gear set and including a second sun gear, a second planet gear carrier, second planet gears mounted for rotation on said second planet gear carrier and in meshing engagement with said second sun gear, and a second ring gear in meshing engagement with said second planet gears, said second planetary gear set being arranged to drive said output shaft;
a torque converter having an impeller operatively coupled to said input shaft and including a primary turbine operatively coupled to said first planet gear carrier, a secondary turbine operatively coupled to said first sun gear, and a stator operatively coupled by a one-way clutch to said transmission housing;
first brake means operatively coupled to said transmission housing and said primary turbine for selectively braking said primary turbine to said transmission housing;
said first planet gear carrier being operatively coupled to said first brake means for selectively braking said first planet gear carrier with said primary turbine relative to said transmission housing;
a second ring gear being operatively coupled to said first brake means for selectively braking said second ring gear, said first carrier and said primary turbine to said transmission housing;
a first, friction clutch operatively coupled to said first ring gear and said second sun gear for selectively coupling said first ring gear to said second sun gear; and
means for directly coupling said input shaft to said first planetary gear set.

2. A transmission apparatus as claimed in claim 1 further comprising:
a second friction clutch operatively coupled to said second ring gear and said second sun gear for selectively coupling said second ring gear to said second sun gear, thereby locking up said second planetary gear set when the second clutch is engaged.

3. A transmission apparatus as claimed in claim 2 wherein said means for directly coupling said input shaft to said first planetary gear set comprises a third clutch operatively coupled to said input shaft and said secondary turbine for selectively coupling said input shaft to said secondary turbine and the first sun gear when the third clutch is engaged.

4. A transmission apparatus as claimed in claim 3, further comprising:
a second brake means operatively coupled to said second sun gear and said housing for selectively braking said second sun gear to said housing.

5. A transmission apparatus as claimed in claim 1 further comprising:
a power take-off means operatively coupled to said primary turbine and said first brake means for selectively driving said power take-off means from said primary turbine and braking said power take-off means to said transmission housing.

6. A method of producing four forward speed ranges and two reverse speed ranges in a planetary transmission including:
a transmission housing;

a first planetary gear set having a first sun gear, a first planet gear carrier, first planet gears mounted for rotation on said first planet carrier and in meshing engagement with said first sun gear, and a first ring gear in meshing engagement with said first planet gears;

a second planetary gear set having a second sun gear, a second planet gear carrier, second planet gears mounted for rotation on said second planet gear carrier and in meshing engagement with said second sun gear, and a second ring gear in meshing engagement with said second planet gears;

a torque converter having an impeller, an input shaft arranged to transmit torque to said impeller, a primary turbine arranged to transmit torque to said first planetary gear set, a secondary turbine arranged to transmit torque to said first planetary gear set, and a stator coupled to said transmission housing by a one-way clutch;

and a plurality of brakes and clutches selectively engageable to establish said four forward and two reverse ranges, said method comprising:

establishing a first forward speed range by braking said first ring gear and said second sun gear relative to said transmission housing and combining the torque transmitted by said primary turbine and said secondary turbine in said first planetary gear set;

establishing a second forward speed range by continuing to brake said second sun gear while releasing said braked first ring gear when the ratio of the speed of rotation of the primary turbine to the speed of rotation of the impeller increases to a predetermined ratio, thereby reducing the torque transmitted by said secondary turbine to said first planetary gear set substantially to zero;

establishing a third forward speed range by coupling said second ring gear to said second sun gear thereby locking up said planetary gear set; and establishing a fourth forward speed range by coupling said first ring gear and said second ring gear to said second sun gear, and coupling said impeller to said secondary turbine, thereby locking up said transmission for direct drive.

7. The method as claimed in claim 6 further comprising:

establishing an additional phase of operation in said second and third forward speed ranges by automatically releasing said one-way clutch coupling said stator to said transmission housing and permitting said one-way clutch and said stator to overrun when the torque transmitted by said primary turbine decreases to the torque transmitted by said input shaft.

8. The method as claimed in claim 6 further comprising:

establishing a reverse low speed range by braking said primary turbine relative to said transmission housing.

9. The method as claimed in claim 6 further comprising:

establishing a reverse low speed range by braking said first planet gear carrier and said second ring gear relative to said transmission housing.

10. The method as claimed in claim 9 further comprising:

establishing a reverse high speed range by braking said primary turbine, said first planet gear carrier and said second ring gear relative to said transmission housing, and coupling said impeller to said secondary turbine.

11. The method as claimed in claim 6 further comprising:

providing overrun engine braking in the four forward speed ranges and the two reverse speed ranges.

12. A planetary transmission apparatus comprising:

a transmission housing;

an input shaft;

an output shaft;

a first planetary gear set in said housing including a first sun gear, a first planet gear carrier, first planet gears mounted for rotation on said first planet gear carrier and in meshing engagement with said first sun gear, and first ring gear in meshing engagement with said first planet gears, said first planetary gear set being arranged to be driven by said input shaft;

a second planetary gear set in said housing operatively connected with said first planetary gear set and including a second sun gear, a second planet gear carrier, second planet gears mounted for rotation on said second planet gear carrier and in meshing engagement with said second sun gear, and a second ring gear in meshing engagement with said second planet gears, said second planetary gear set being arranged to drive said output shaft;

a torque converter having an impeller operatively coupled to said input shaft and including a primary turbine operatively coupled to said first planet gear carrier, a secondary turbine operatively coupled to said first sun gear, and a stator operatively coupled by a one-way clutch to said transmission housing;

first brake means operatively coupled to said transmission housing and said primary turbine for selectively braking said primary turbine to said transmission housing;

said first planet gear carrier being operatively coupled to said first brake means for selectively braking said first planet gear carrier with said primary turbine relative to said transmission housing;

a second ring gear being operatively coupled to said first brake means for selectively braking said second ring gear, said first carrier and said primary turbine to said transmission housing; and a first friction clutch operatively coupled to said first ring gear and said second sun gear for selectively coupling said first ring gear to said second sun gear, said planetary transmission apparatus being arranged such that drive from said input shaft to said output shaft must be made through at least one of said first and second planetary gear sets.

13. A transmission apparatus as claimed in claim 12 further comprising:

a second friction clutch operatively coupled to said second ring gear and said second sun gear for selectively coupling said second ring gear to said second sun gear, thereby looking up said second planetary gear set when the second clutch is engaged.

14. A transmission apparatus as claimed in claim 13 further comprising:

a third clutch operatively coupled to said input shaft and said secondary turbine for selectively coupling said input shaft to said secondary turbine and the first sun gear when the third clutch is engaged.

15. A transmission apparatus as claimed in claim 14, further comprising:

a second brake means operatively coupled to said second sun gear and said housing for selectively braking said second sun gear to said housing.

16. A transmission apparatus as claimed in claim 12 further comprising:

a power take-off means operatively coupled to said primary turbine and said first brake means for selectively driving said power take-off means from said primary turbine and braking said power take-off means to said transmission housing.

* * * * *